Feb. 23, 1954     M. N. WEBER     2,669,869
APPARATUS FOR GAUGING CONSUMPTION OF OIL OR OTHER LIQUID
Filed Sept. 21, 1949     2 Sheets-Sheet 1

INVENTOR.
Milton N. Weber
BY
Barnes, Kisselle, Laughlin & Raisch
Attorneys.

Feb. 23, 1954   M. N. WEBER   2,669,869
APPARATUS FOR GAUGING CONSUMPTION OF OIL OR OTHER LIQUID
Filed Sept. 21, 1949                              2 Sheets-Sheet 2

INVENTOR.
Milton N. Weber
BY
Attorneys.

Patented Feb. 23, 1954

2,669,869

UNITED STATES PATENT OFFICE 2,669,869

APPARATUS FOR GAUGING CONSUMPTION OF OIL OR OTHER LIQUID

Milton N. Weber, Detroit, Mich., assignor of one-half to Herbert W. Link, Detroit, Mich.

Application September 21, 1949, Serial No. 116,954

5 Claims. (Cl. 73—113)

This invention relates to an apparatus for determining the consumption of a liquid and it is concerned particularly with an apparatus for determining the consumption of oil in an engine.

In the testing of engines and particularly internal combustion engines, such as gasoline burning engines and diesel engines, it is often desirable to ascertain information as to the consumption of oil. By ascertaining such information, much knowledge can be had as to what is going on inside the engine during its operation, how the piston rings are functioning and other items, such as the expected valve operation and economy of the engine as well as other factors. One way to ascertain oil consumption is to start the engine operating with a known quantity of oil therein and then to measure the oil after the engine has been operated over quite an extended period of time. The present invention has to do with an apparatus which continuously operates and gives an indication of the oil consumption as the engine is operating. The invention aims to provide a precision apparatus or instrument capable of indicating relatively minute differences in oil quantities so that the oil consumption characteristic of the engine can be ascertained in a relatively short time as compared to the above mentioned program of measuring the oil before and after a long run of the engine.

A device constructed in accordance with the invention is shown in the accompanying drawings.

Figure 2:
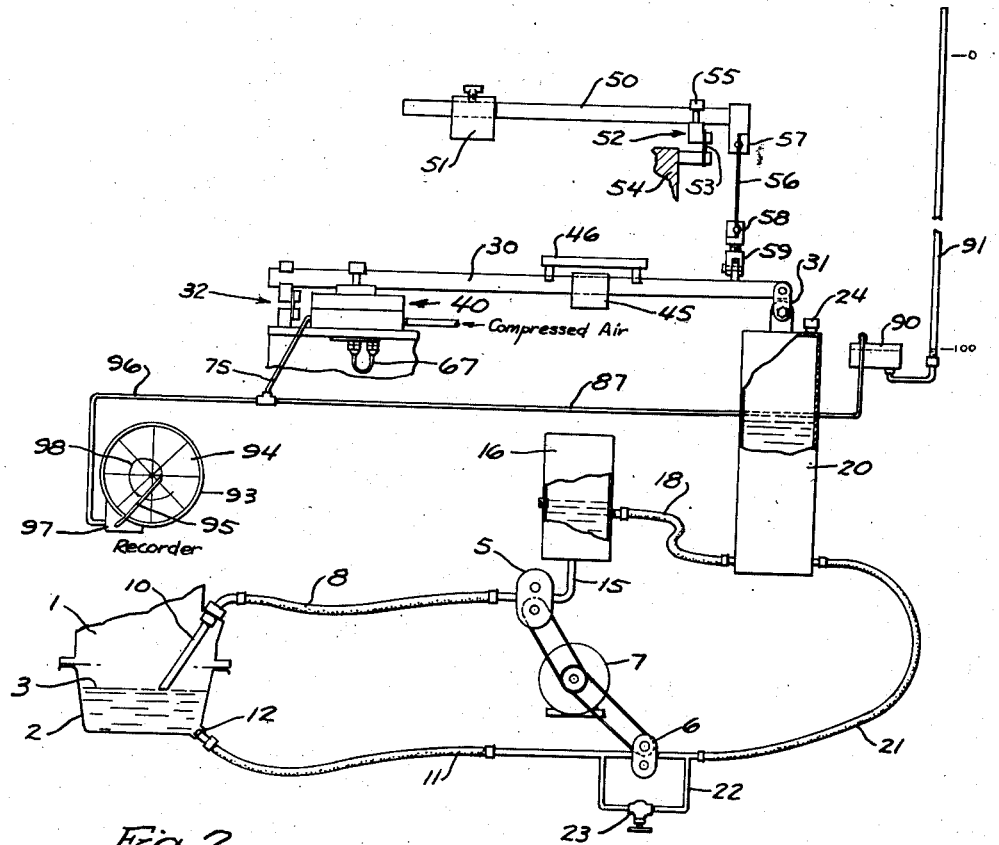
Fig. 2 is a rather diagrammatic view illustrating the system and showing certain mechanical features of the apparatus.

Referring first to Fig. 2, the engine is shown at 1, with its crank case at 2 having oil therein up to the level as indicated at 3. A circulatory system for the oil is provided, this system including a pump 5 and a pump 6 with the pumps driven by a motor 7. The pump 5 is connected by a suitable conduit 8 with an inlet pipe 10 associated with the engine, while a conduit 11 connects the pump 6 to the lower portion of the engine crank case, as shown at 12. As the pumps are operated, the oil is drawn out of the crank case by the pump 5 and is pumped back into the crank case by pump 6. The pump 5 has a capacity greater than the pump 6 so that the level 3 of the oil in the crank case remains constant. In other words, more oil cannot be pumped back into the crank case than is removed.

A conduit or pipe 15 extends from the pump 5 into the lower portion of a closed container 16 which serves in the manner of an air bell to dampen out impulses. Air and other gas is trapped in the upper portion of the closed chamber 16 above the level of the liquid therein. A conduit 18, some or all of which is flexible, extends to the lower portion of a closed tank 20 while leading from the tank 20 is a conduit 21, some or all of which is in the nature of a flexible hose, and this extends to the pump 6. There is preferably a by-pass 22 with a control valve 23 therein extending around the pump 6. The tank 20 is provided with a vent valve 24 so that the tank may be vented.

When this system is in operation, with a given quantity of oil therein, the entire system is full of oil except, of course, for the upper portion of the air bell 16 and for a part of the upper portion of the tank 20. The amount of oil which is present in the initial stages of the operation, determines the level of the liquid in the tank 20. In other words, the level of the liquid in the tank 20 is the level which varies with variation in the quantity of the oil while the level of the liquid in the crank case in the engine remains constant. The valve 23 in the by-pass 22 is a throttling valve and may be manipulated to balance the system so that the correct or desired amount of oil flows through the system.

The tank 20 is supported by a weighing or load indicating mechanism and, as shown, the tank is preferably suspended therefrom with the flexible conduits 18 and 21 providing for movement of the tank if any is needed. The load indicating mechanism includes an arm or bar 30 from which the tank is suspended by a link 31. This bar is fulcrumed at one end, the fulcrum being generally indicated at 32 and shown in detail in Figs. 3 and 4. This fulcrum comprises a piece of thin elastic or spring like metal 33, securely clamped between a block 34 and a block 35 with the block 34 attached to a suitable support 36. The opposite end of the flexible metal leaf is clamped by the similar blocks 37 and 38 by screws as shown, there being an intervening exposed portion of the elastic leaf as indicated. The block 37 is clamped to the bar 30 by means of a clamp 39. This fulcrum, therefore, is constituted by an elastic or flexible metal piece 33.

The load on the lever arm 30 is at the tank 20 while the resistance is obtained by an air pressure device generally shown at 40, presently to be described. This device includes a plug or plunger 41 clamped to the arm 30 by a clamp 42.

The arm 30 is in the nature of a scale balance arm and it has a slidable weight 45 thereon and preferably a tray 46 for receiving other weights. For the purpose of counter-balancing the fixed or dead load of the tank, there is a counter-balancing arm 50 having an adjustable weight 51 thereon, and this arm has a fulcrum generally shown at 52 preferably of the same structure as the fulcrum just described for the arm 30. In other words, this fulcrum comprises a thin sheet of elastic metal 53 clamped at one end and mounted on a support 54 and clamped at the other end and mounted on the arm 50 at as 55. A steelyard has one end clamped as at 57 and thus secured to the arm 50 and its other arm is clamped as at 58 and secured to the arm 30 as at 59.

In the initial installation or set up of the device, the counter-balancing mechanism is set to precisely counter-balance the dead load of the tank when it is empty. This is done by adjusting the weight 51 and with this setting once obtained, the weight 51 is locked in position as by means of a set screw or the like, as shown, and is not to be tampered with thereafter, unless the system, for one reason or another, gets out of balance.

Figure 3:
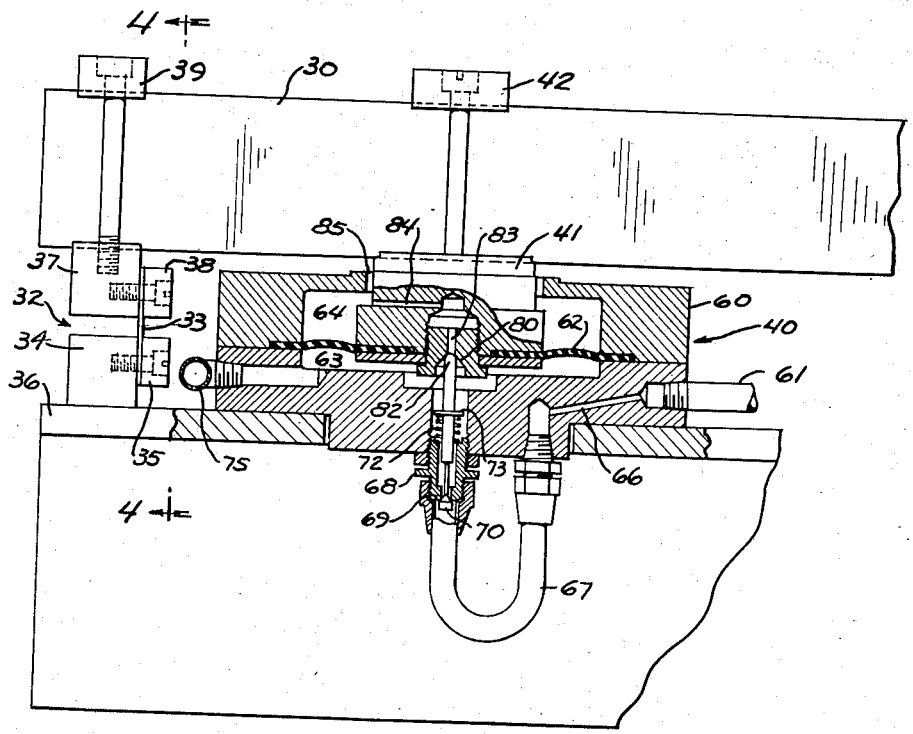
Fig. 3 is an enlarged view largely in cross section showing a pneumatic balancing unit.
Figure 4:
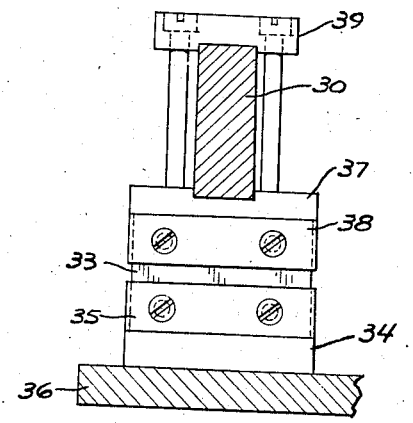
Fig. 4 is a sectional view taken substantially on line 4—4 of Fig. 3 showing a fulcrum structure.

The pneumatic balancing device is shown in detail in Fig. 3 and it comprises a casing 60 to which air under pressure is supplied through conduit 61. This casing has a diaphragm 62 which divides the casing into a chamber 63 and a chamber 64 and the plug 41 is secured to the diaphragm.

The compressed air supply line leads through a passage 66 to a conduit 67 and the conduit 67 connects into the chamber 63 through a valve having a body 68. This valve has a seat 69 for a valve member 70 held normally seated by coil spring 72 reacting against the valve body and an abutment or washer 73 on the valve stem. An air pressure conduit 75 leads from the chamber 63.

The plug 41 is equipped with a valve member having a valve seat 80 arranged to be closed by the end of the valve stem 82. Leading from the valve seat 80 is a port 83 which connects into a passage 84 which, in turn, leads to chamber 64 and to the asmosphere through the clearance 85 between the housing 60 and plug 41.

As shown in Fig. 2, the pressure line 75 connects to a pressure line 87 which leads to a suitable pressure gauge. The gauge diagrammatically shown in Fig. 2 is a type of manometer having a reservoir 90 for mercury and a tube 91 connected to the bottom thereof and extending upwardly alongside suitable indicia as shown at 92 in Fig. 1. The pressure of the air on the surface of the mercury in the closed reservoir 90 depresses the level of the mercury and raises the level of the mercury in 91.

A recording device is also preferably used, this being indicated generally at 93 having a chart 94 which is rotatable and an arm of the marker or pen thereon, as shown at 95. The pressure line 75 connects into a line 96 which is connected to the recorder as shown at 97 to thus vary the position of the arm 95 in accordance with the pressure. Such recorders are known to those versed in the art and need no detailed description. Suffice it to say, that as the chart 94 rotates, the arm 95 draws a line thereon as indicated by the dotted lines at 98, thus indicating a variation in the pressure.

Figure 1:
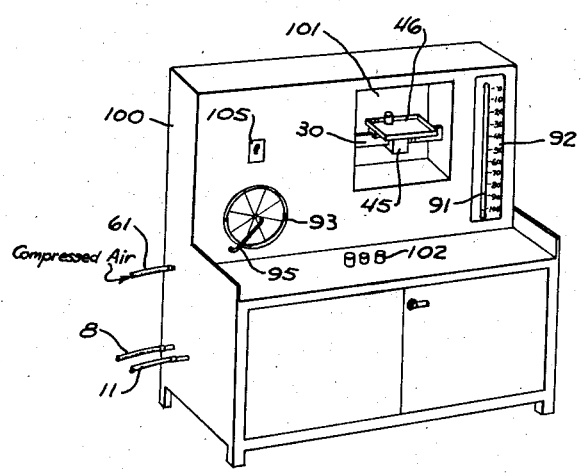
Fig. 1 is a general perspective view illustrating a cabinet and some of the parts of the apparatus.

The mechanism thus described is preferably and conveniently located in a cabinet 100, as shown in Fig. 1, the conduits 8 and 11 extending into the same and with the compressed air supplied thereto through the conduit 61. The chart of the gauge is mounted so that it is exposed, as shown, as is also the manometer and its associated indicia. The cabinet is provided with a recess 101 which exposes the tray 46 and the sliding weight 45 on the arm 30. Several weights, indicated at 102, may rest upon the table portion of the cabinet and one or more of these weights may be placed in the tray 46. A control switch for the motor is shown at 105.

The pressure balancing device, shown in Fig. 3, operates as follows: In a balanced condition, that is, when the load on the arm 30 is balanced by the air trapped in chamber 63 under the diaphragm 62, the parts are substantially as indicated in Fig. 3. Pressure in the chamber 63 will remain constant as long as the load on the arm is constant and this pressure is transmitted to the manometer and to the recorder. The indicia 92 may be in suitable units of weight or pressure. If the load on the arm is lessened air pressure in chamber 63 shifts the diaphragm and the block upwardly as Fig. 3 is viewed, thus opening the port 83 as the seat 80 moves away from the valve stem 82 and some of the air is vented to the atmosphere until a balanced condition is again attained. If the load on the arm is increased so that the arm moves downwardly about its fulcrum the valve 70 is unseated from its seat 69 and air under pressure enters the chamber 63 and the diaphragm and plug 41 elevated until a balanced condition is again attained. Thus whatever the load on the arm 30, it is balanced by the air under pressure in the chamber 63. It will be noted that the leverage advantages of the arm 30, as shown in Fig. 2, is considerable and it might be stated that maximum movement of the tank 20 as its load is increased or lessened is but a few thousandths of an inch regardless of the amount of variation. In other words, a very slight movement of the arm occurs with a few ounces in variation in the load in the tank 20 and a greater load variation, such as several pounds, or any amount within the capacity of the machine.

It is to be presumed, in considering the operation of the device, that the dead or gross load of the tank and such other parts as are associated therewith on the lever 30, is balanced out by the balancing mechanism, including arm 50 and weight 51 when the system is empty. The conduits 8 and 11 are connected with the engine and the system set into operation with a determined quantity of oil. This quantity of oil need not be ascertained with great accuracy so long as there is sufficient oil to fill the system and maintain a substantial quantity of oil in the tank 20. The top of the tank may be vented for the original set up. With the engine in operation, and with the motor 7 operating, the oil is circulated through the system and because the pump 5 has greater capacity than the pump 6 the level 3 of the oil in the engine crank case is maintained at a constant level. This can be visualized by explaining that if, after initially starting the machine, another quart of oil is added to the crank case, the level of oil in the tank 20 will rise by reason of the added oil while the level 3 will remain constant.

With the engine and apparatus thus put into operation, a desired reading at the manometer may be obtained by placing or removing weights from the tray as needed and by shifting the weight 45. It is thought to be preferred to so adjust the mechanism that at the start of a test the manometer reads zero. However, any other reading may be selected. As the oil is consumed by engine operation, the difference between the original quantity of oil and that remaining after some consumption shows at any time, and at all times, at the manometer. The manometer may be read from time to time. In other words, as the oil is consumed the level of oil in the tank lowers and the weight of the oil in the tank lowers thus requiring a lower pressure in the chamber 63 to balance the same. This balancing pressure may be read at the manometer and the same pressure operates the arm 95 of the recorder. The line provided by the recorder indicates the rate of oil consumption. That is to say, the consumption of oil may not be uniform over the required test period but may, for example, be greater at the start and lesser toward the end of the test period or vice versa.

The apparatus is extremely delicate in that it accurately measures oil consumption in ounces and fractions thereof. As a result, the oil consumption of an engine may be ascertained by a very short test; i. e., a test over a short period of time. By computation, the consumption over a longer period of time may be obtained. Thus, a short test period will suffice for many hours of test period heretofore found necessary.

I claim:

1. In an apparatus for gauging the consumption of oil by an internal combustion engine, a flow system including a pump having an inlet for disposition within an engine crank case for pumping oil from the engine crank case to the level of the inlet, the system having a conduit for conveying oil back into the engine crank case, whereby a substantially constant level of oil is maintained in the crank case while the engine is operating, a tank in the system in which the oil is maintained at a level which is dependent upon the total quantity of oil in the crank case and in the system, pneumatic load balancing means for supporting the tank, and means for constantly indicating the pneumatic pressure required to support the tank and the oil therein as the engine is operating to thereby indicate reduction in the amount of oil in the tank as the engine consumes the oil.

2. In an apparatus for gauging consumption of oil by an internal combustion engine, a flow system including a conduit having an inlet end adapted to be temporarily disposed in the crank case at the level of the oil to be maintained in the crank case, a pump for pumping oil out of the crank case through said conduit, a second conduit adapted to be temporarily connected into the crank case, a second pump for pumping oil back into the crank case through said second conduit, a tank in the system positioned to receive oil from the first mentioned pump and to pass oil to the second mentioned pump and in which the oil is maintained at a level which is dependent upon the total quantity of oil in the crank case and in the system, means for dampening impulses from the first mentioned pump to minimize disturbance of the oil in the tank, said first named pump having a capacity greater than the second named pump whereby to insure maintenance of the oil at a fixed level in the crank case, pneumatic load balancing means for supporting the tank and the oil therein, and means for indicating the pneumatic pressure required to support the tank and the oil therein to thereby indicate variation in the amount of oil in the tank.

3. In an apparatus for gauging consumption of oil by an internal combustion engine, a flow system including a conduit having an inlet end adapted to be temporarily disposed in the crank case at the level of the oil to be maintained in the crank case, a pump for pumping oil out of the crank case through said conduit, a second conduit adapted to be temporarily connected into the crank case, a second pump for pumping oil back into the crank case through said second conduit, a tank in the system positioned to receive oil from the first mentioned pump and to pass oil to the second mentioned pump and in which the oil is maintained at a level which is dependent upon the total quantity of oil in the crank case and in the system, means interposed between the first mentioned pump and the tank for dampening impulses from the first mentioned pump, thereby to minimize disturbance of the oil in the tank, said first named pump having a capacity greater than the second named pump whereby to insure maintenance of the oil at a fixed level in the crank case, pneumatic load balancing means for supporting the tank and the oil therein, means for indicating the pneumatic pressure required to support the tank and the oil therein to thereby indicate variation in the amount of oil in the tank, and a valve controlled by-pass in the system around the second named pump operable to balance the system.

4. In an apparatus for gauging the consumption of oil by an internal combustion engine, a flow system including a pump having an inlet adapted for temporary disposition within an engine crank case for pumping oil from the engine crank case to the level of the inlet, the system having a conduit adapted to be temporarily connected to the engine crank case for conveying oil back into the engine crank case, whereby a substantially constant level of oil is maintained in the crank case while the engine is operating, a tank in the system in which the oil is maintained at a level which is dependent upon the total quantity of oil in the crank case and in the system, a balance arm from which the tank is suspended, a fulcrum for the balance arm, pneumatic load balancing means for supporting the balance arm arranged and constructed so that the arm is balanced by air pressure with the air pressure varying with variations in the quantity of oil in the tank, and gauging means for constantly indicating the balancing air pressure to thereby indicate variations in the amount of oil in the tank during engine operation.

5. In an apparatus for gauging consumption of oil by an internal combustion engine, a flow system including a conduit having an inlet end adapted to be temporarily disposed in the crank case at the level of the oil to be maintained in the crank case, a pump for pumping oil out of the crank case through said conduit, a second conduit adapted to be temporarily connected into the crank case, a second pump for pumping oil back into the crank case through said second conduit, a tank in the system positioned to receive oil from the first mentioned pump and to pass oil to the second mentioned pump and in which the oil is maintained at a level which is dependent upon the total quantity of oil in the crank case and in the system, means for dampening impulses from the first mentioned pump to minimize disturbance of the oil in the tank, said first named pump having a capacity greater than the second named pump whereby to insure maintenance of the oil at a fixed level of the crank case, a balance arm from which the tank is suspended, a fulcrum for the balance arm, pneumatic load balancing means for supporting the balance arm arranged and constructed so that the arm is balanced by air pressure with the air pressure varying with variations in the quantity of oil in the tank, and gauging means for constantly indicating the balancing air pressure to thereby indicate variations in the amount of oil in the tank during engine operation.

MILTON N. WEBER.

References Cited in the file of this patent
UNITED STATES PATENTS

| Number | Name | Date |
| --- | --- | --- |
| 1,022,622 | Coffin | Apr. 9, 1912 |
| 2,037,879 | Chalatow | Apr. 21, 1936 |
| 2,314,178 | Tate | Mar. 16, 1943 |
| 2,327,419 | Grandy | Aug. 24, 1943 |
| 2,409,982 | Longmate | Oct. 22, 1946 |
| 2,493,012 | Moore et al. | Jan. 3, 1950 |